United States Patent Office 3,079,754
Patented Mar. 5, 1963

3,079,754
GAS TURBINE PLANTS WITH HEAT
EXCHANGERS
Paul Kolb, Newcastle-upon-Tyne, England, assignor to C. A. Parsons & Company Limited, Newcastle-upon-Tyne, England
Filed Sept. 9, 1955, Ser. No. 533,359
2 Claims. (Cl. 60—39.51)

The invention relates to means for heating the working medium of a gas turbine plant.

More particularly it is concerned with the arrangement of a combustion chamber and heat exchanger and the flow paths of gaseous media therethrough.

In gas turbine plants which incorporate a heat exchanger it is usual for the air to be compressed in a compressor and then to receive heat in a heat exchanger which may comprise a number of tubes through which hot exhaust gases from the turbine flow, these tubes being arranged parallel to and around a combustion chamber, which heated air enters and where it receives a further amount of heat by the combustion of a suitable fuel. The working medium thus formed is then expanded in a turbine or turbines the exhaust from which is led through the heat exchanger where it releases heat to the air forming the combustion medium passing through the heat exchanger on its way to the combustion chamber.

The incorporation of a heat exchanger increases the length and complexity of the ducting arrangements of the plant and it is the object of this invention to reduce the length of the ducting required and to simplify the arrangement which we do by directing the various gases through the heater in a particular way.

The invention consists in means for heating the working medium of a gas turbine which means comprise a casing, a combustion chamber within the casing, a number of tubes arranged in a space formed between the combustion chamber and casing such that a space is left between said tubes and the casing on the one hand and the tubes and the combustion chamber on the other, said heating means containing two separate flow paths, one flow path being through the inside of the tubes, the other being along a path passing to and fro over the outside of the tubes in a direction substantially at right angles to the axis of the tubes and through the combustion chamber.

The invention also consists in means in accordance with the preceding paragraph in which the exhaust gases from the turbine are caused to flow through the inside of the tubes and air from a compressor is caused to flow to and fro over the tubes in a direction substantially at right angles to the axis of the tubes before entering the combustion chamber where it takes part in the combustion of a fuel, the combustion products from said combustion chamber being conducted to the inlet of the turbine.

The invention also consists in means for heating the working medium of a gas turbine and in gas turbine plants with heat exchangers, in accordance with claims 1 and 2 below.

Referring to the accompanying diagrammatic drawings.

Figure 1:
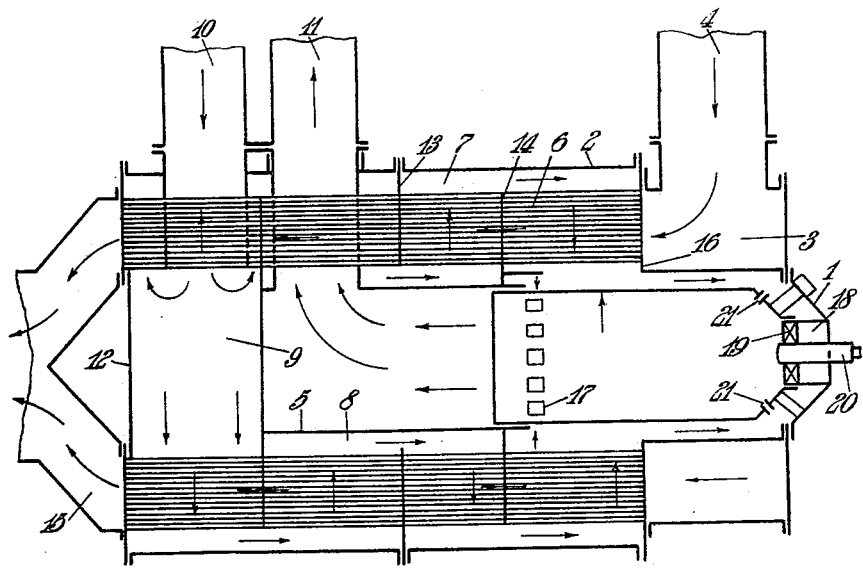
FIGURE 1 shows in sectional elevation a heat exchanger and combustion chamber in accordance with one form of the invention.

Referring to FIGURE 1, a combustion chamber 1 is arranged at the centre of a cylindrical casing 2. Surrounding the inlet end of the combustion chamber, that is to say the one at which the air for combustion enters, is arranged an angular header 3 which is connected by duct 4 to the exhaust of a turbine 4a shown in FIGURE 2. In the annular space between wall 5 of the combustion chamber and the outer casing 2 a nest of tubes 6 is arranged. The tubes do not completely fill this space but are arranged so that an annular space 7 is left between the outer periphery of the tube nest and the casing 2 and an annular space 8 between the inner periphery of the tube nest and the combustion chamber wall 5.

The tube nest 6 extends beyond the end of the combustion chamber 1 at the end of the casing remote from the inlet header 3 for the gases from the turbine, providing a space 9 bounded by the inner periphery of the tube nest, into which space cold air from a compressor is led via duct 10.

The products of combustion leave the combustion chamber 1 via a duct 11 which is arranged adjacent to the duct 10.

The ducts 10 and 11 pass through a space left for this purpose between the tubes of tube nest 6.

A wall 12 forming the end wall at the outlet end of the combustion chamber extends in a radial direction to the outer periphery of the tube nest and acts as a baffle to prevent air, passing over the surfaces of the tubes, from flowing in an axial direction.

Further annular baffles 13 and 14 are arranged in the tube nest, spaced from each other in an axial direction. Baffle 13 is fixed to the casing 2 and extends to the inner periphery of the tube nest 6 whilst baffle 14 extends from the wall of the combustion chamber to the outer periphery of the tube nest 6. Whilst only three baffles 12, 13 and 14 are shown in the diagram more may be added if desired.

At the end of the tube nest remote from the inlet header 3 is arranged an annular exhaust duct 15 for collecting the cooled turbine gases leaving the tube nest.

Figure 2:
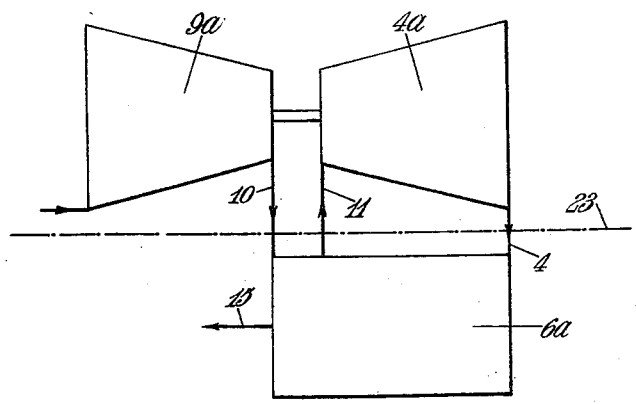
FIGURE 2 shows an arrangement of a gas turbine plant incorporating a heat exchanger and combustion chamber in accordance with one form of the invention.

In operation hot exhaust gases from turbine 4a enter the tubes of tube nest 6 of the heat exchanger indicated in FIGURE 2 with the reference numeral 6a, from duct 4 by inlet header 3, pass through the tubes, releasing their heat content, and leave by exhaust duct 15. Cold high pressure air enters header 9 from a compressor 9a via duct 10, flows outwards over the tubes in a generally radial direction into annular space 7, receiving heat during its passage. In space 7 it flows in a generally axial direction before being diverted, due to baffles 13, in a generally radial direction through the tube nest again to annular space 8, from which it is again diverted in a radially outwards direction by baffle 14 into space 7. Finally the air is diverted inwardly into space 8 again by the end wall and tube plate 16 of the casing. On entering space 8 a proportion of the air passes through holes 17 in the combustion chamber wall for the purpose of reducing the temperature of the products of combustion leaving the combustion chamber, to suit turbine requirements, whilst the remainder of the now preheated air flows in an axial direction in space 8 to enter space 18 from which it passes through swirler 19 into the combustion chamber where it mixes with fuel from burner 20.

The products of combustion leave the combustion chamber via duct 11 and are conducted to the inlet of turbine 4a.

Provision is also made for a proportion of the preheated air to enter the combustion chamber via ports, indicated by 21, in the conical end wall of the combustion chamber 1 for the purpose of ensuring complete combustion and for cooling purposes.

The wall of the combustion chamber is also cooled by the air flowing in space 8.

From FIGURE 2 can be seen the advantage of such a heating arrangement in a gas turbine plant. The ducting can be reduced to three straight ducts between compressor, turbine and heater as shown and indicated respectively by the reference numerals 10, 11 and 4. A dotted line 23 indicates floor level in an arrangement in which only compressor and turbine would be seen above floor level together with part of the three vertical ducts 10, 11 and 4 leading to the heater.

I claim:

1. Means for heating the working medium of a gas turbine which means comprise a casing, a combustion chamber within said casing, a plurality of tubes arranged between the combustion chamber and the casing and leaving a space between the tubes and the casing on the one hand and the tubes and the combustion chamber on the other, the inlet end of the combustion chamber extending beyond the tubes in an axial direction while at the outlet end of said chamber the tubes extend in an axial direction beyond the combustion chamber; an annual chamber surrounding the said inlet end of the combustion chamber and in communication with the inside of the tubes and by means of a duct with the turbine outlet whereby exhaust gas from the turbine is conducted through the inside of the tubes to an outlet at the end of said tubes, an inlet duct from the compressor outlet which inlet duct passes about the tubes adjacent the outlet ends thereof, which inlet duct leads working medium from the compressor to a space between the tubes adjacent the outlet end of the combustion chamber, baffles axially spaced along the said tubes, the working medium being caused to flow from said space over successive sections of the tubes first in a generally radial outward direction and then in a generally radial inward direction between the axially spaced baffles and between the space between tubes and casing and the space between tubes and combustion chamber, before entering the combustion chamber where it takes part in the combustion of a fuel, and an outlet duct situated intermediate the inlet duct for exhaust gas from the turbine and the inlet duct for working medium from the compressor which outlet duct leads the combustion products from the combustion chamber through a space between the tubes to the turbine inlet, said combustion products forming the working medium for the turbine.

2. A gas turbine plant comprising heating means for the working medium as claimed in claim 1 and an air compressor and turbine, the compressor turbine and heater being connected by three straight ducts namely one from compressor to heater, one from heater to turbine inlet and one from turbine outlet to heater.

References Cited in the file of this patent
UNITED STATES PATENTS

| | | |
|---|---|---|
| 1,045,961 | De Ferranti | Dec. 3, 1912 |
| 2,591,540 | Grylls | Apr. 1, 1952 |